United States Patent
O'Pry

[15] 3,661,470
[45] May 9, 1972

[54] THREADING ATTACHMENT

[72] Inventor: Arthur F. O'Pry, Houston, Tex.

[73] Assignee: Camco, Incorporated, Houston, Tex.

[22] Filed: June 1, 1970

[21] Appl. No.: 41,827

[52] U.S. Cl..................................408/137, 10/129, 10/139, 10/141 H
[51] Int. Cl......................B23g 1/16, B23g 1/18, B23g 1/46, B23g 5/16
[58] Field of Search....................10/87, 89 H, 105, 129, 139, 10/141 H; 408/11, 128, 130, 137, 138, 214

[56] References Cited

UNITED STATES PATENTS

| | | |
|---|---|---|
| 1,796,538 | 3/1931 | Rupple......................................10/105 |
| 2,069,098 | 1/1937 | Rupple......................................10/105 |
| 2,286,715 | 6/1942 | Cheever....................................10/105 |
| 2,501,298 | 3/1950 | Winchell..................................408/128 |
| 2,581,082 | 1/1952 | Drissner et al...........................10/105 |
| 2,637,052 | 5/1953 | Woock....................................408/137 |
| 3,123,847 | 3/1964 | Willis et al..............................10/139 |

Primary Examiner—Charles W. Lanham
Assistant Examiner—E. M. Combs
Attorney—James F. Weiler, Jefferson D. Giller, William A. Stout, Paul L. De Verter, II, Dudley R. Dobie, Jr. and Henry W. Hope

[57] ABSTRACT

A threading attachment for connection to a rotary power takeoff for providing a thread on a workpiece wherein a pair of threaded nuts are actuated to engage a lead screw to drive a thread cutting means towards the workpiece and after threading are released and a spring return provides a quick return in preparation for the next workpiece.

1 Claim, 3 Drawing Figures

PATENTED MAY 9 1972

Arthur F. O'Pry
INVENTOR.

BY James L. Weely
William G. Stout

ATTORNEYS

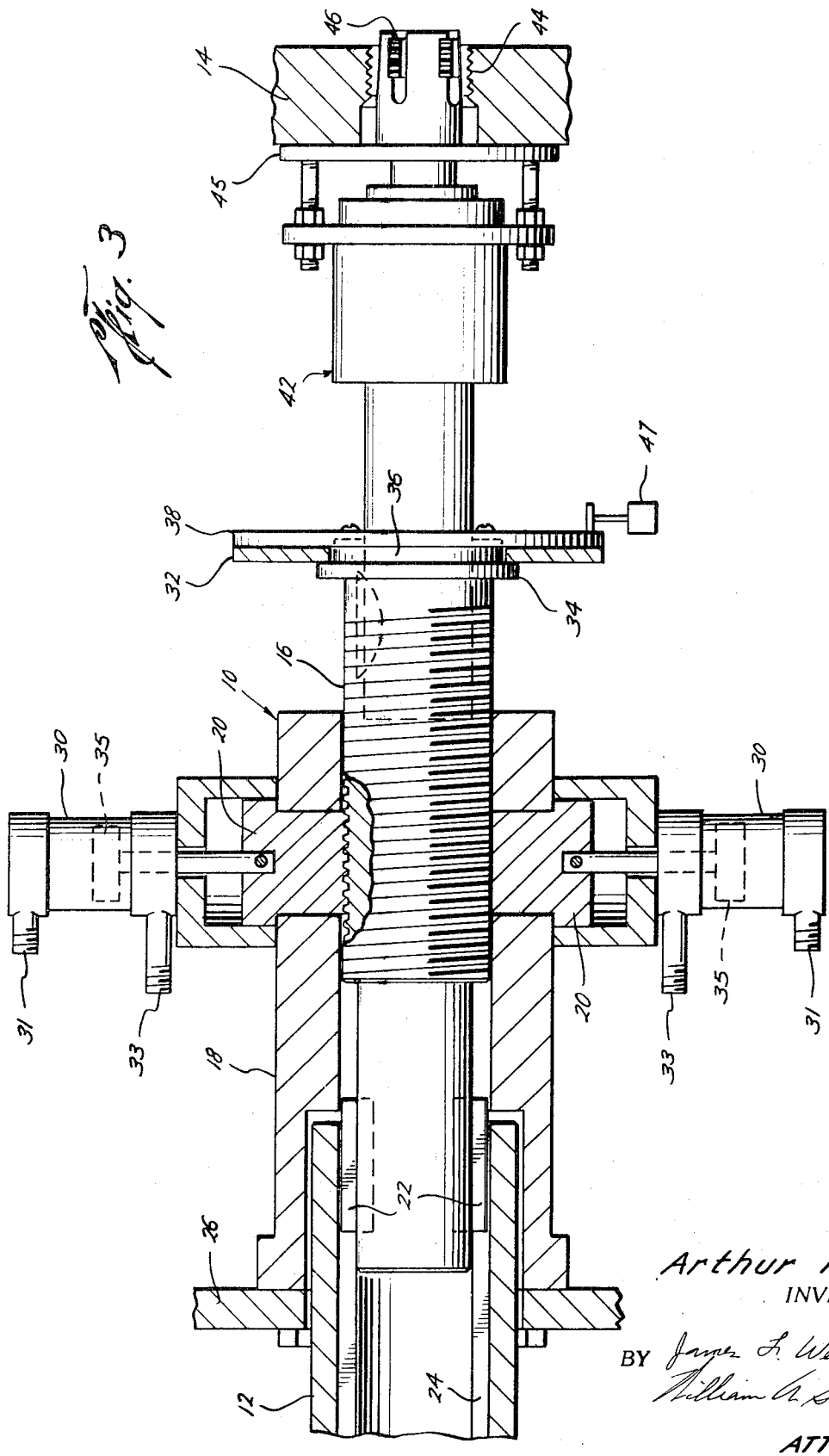

THREADING ATTACHMENT

BACKGROUND OF THE INVENTION

The use of a lead screw to actuate thread cutting means such as taps are old. However, threading attachments for connection to thread cutting machines having a rotary power takeoff such as a continuous rotary shaft have been complicated, subject to failure and have not been readily adapted for use on automatic machines. The present invention is directed to overcoming these defects and provides a threading attachment which can be used on manual or automatic machines to provide a positive drive for cutting a clean thread and which may be quickly retracted for speeding up thread cutting operations on an automatic machine.

SUMMARY

The present invention is adapted to be connected to a rotary power takeoff to provide a thread on a workpiece wherein a lead screw longitudinally and slidably engages the power takeoff whereby the screw may be moved longitudinally while being rotated and includes at least one nut having a threaded face which when engaged with the lead screw allows the screw to carry thread cutting means into engagement with the workpiece, and includes return means for returning the lead screw and thread cutting means after the threading is completed and the nut is retracted from the lead screw.

The invention is further directed to a return plate rotatably supported from the second end of the lead screw with spring means connected between the housing about the lead screw and the return plate for returning the lead screw after threading with means between the return plate and the housing preventing rotation of the return plate.

Another object of the present invention is the provision of fluid actuating means for actuating the threaded nuts into and out of engagement with the lead screw with switch means controlling the fluid actuating the nuts and which is positioned to be actuated by the return plate and wherein the thread cutting means is of a collapsible type.

BRIEF DESCRIPTION OF THE DRAWINGS

FIG. 3 is a cross-sectional view taken along the line 3—3 of FIG. 1 showing the engaging nuts in the engaged position and includes a thread cutting means.

DESCRIPTION OF THE PREFERRED EMBODIMENT

Figure 1:
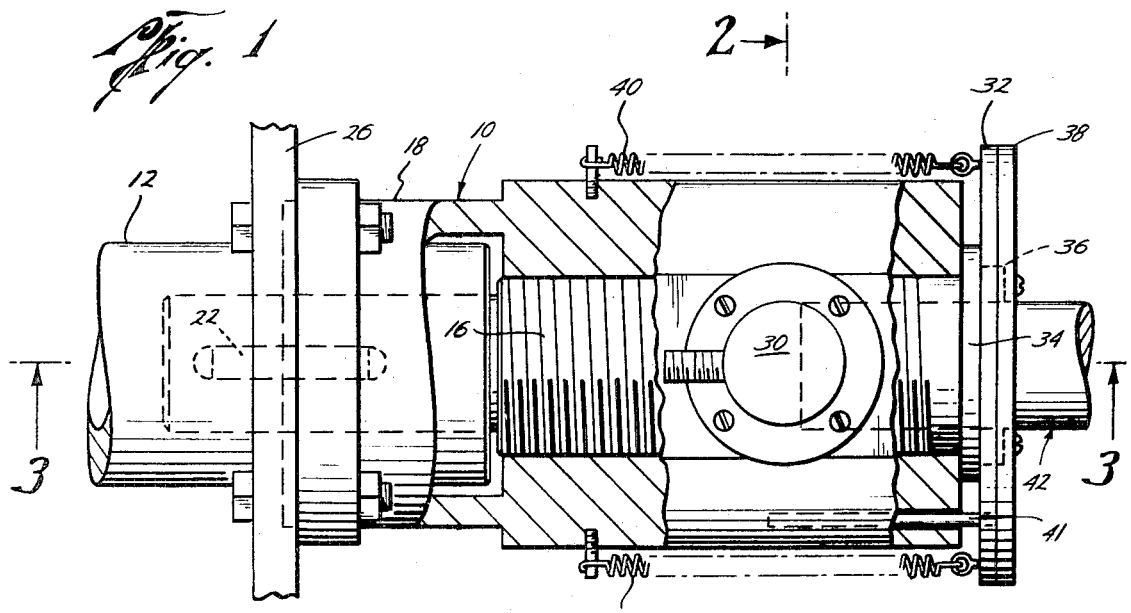
FIG. 1 is a fragmentary elevational view, partly in cross section, of the present invention in the retracted position.

Referring now to the drawings, the reference numeral 10 generally indicates the threading attachment of the present invention which may be connected to any suitable rotary power takeoff 12 for cutting a thread on a workpiece 14 which is positioned axially aligned with the power takeoff 12. While any suitable power takeoff 12 may be used, the continuous turning rotary takeoff for a conventional two-headed horizontal machine, such as Burgmaster, may be used to provide a threading operation at one stage of an automatic machine.

The apparatus 10 generally includes a lead screw 16, a housing 18 and one or more engaging nuts 20. The lead screw 16 is axially aligned between the rotary power takeoff 12 and the workpiece 14. Longitudinally slidable engaging means are provided between the lead screw adjacent one end and the power takeoff 12 whereby the screw 16 may be moved longitudinally while being rotated. Thus, the engaging means may include a key 22 on one of the members such as the lead screw 16 which is longitudinally slidable in a keyway 24 in the power takeoff 12. Thus while the lead screw 16 is being continuously rotated it may also be suitably moved longitudinally relative to the power takeoff 12.

The housing 18 is fixedly secured to a suitable support 26 and is positioned about and supports the lead screw 16. A pair of engaging nuts 20 each having an arcuate threaded face 22 for engagement with the lead screw 16 are carried by the housing 18 on opposite sides of the screws 16. Suitable piston and cylinder fluid assemblies 30 are connected to each of the nuts 20 for moving the threaded faces 22 of the nuts 20 into and out of engagement with the thread on the lead screw 16. Each of the cylinder and piston assemblies has fluid connections 31 and 33 whereby a piston 35 is double acting. Thus, when the nuts 20 are in engagement with the lead screws 16 and the lead screw is rotating, the lead screw will then move longitudinally towards the workpiece 14.

A return plate 32 is rotatably supported from the second end of the lead screw 16 against a shoulder 34 such as on a circular support 36 and may be longitudinally held thereon on the second side by a stop 38.

As best seen in FIG. 1, yieldable return means such as springs 40 are connected between the housing 18 and the return plate 32 for returning the lead screw to its original position after the threading operation is completed when the nuts 20 are retracted from the lead screw 16. However, in order to prevent rotationally twisting the springs 40 suitable means are provided to prevent rotation of the return plate 32 such as rods 41 which are connected to the return plate 32 and contact the housing 18.

Any suitable thread cutting means may be carried by the second end of the lead screw 16 and suitably connected thereto for cutting either an external or internal thread on the workpiece 14, here shown for example only, as a receding chaser collapsible type tap, stationary LL, as manufactured by the Landis Machine Company. Thus the thread cutting means 42, which may include a collapsible tap 46 actuated by linkage 45, is rotated and carried longitudinally by the lead screw 16 and will provide a thread 44 on the workpiece 14. When the thread 42 is completed, the linkage 45 will contact the workpiece 14 and the tap 46, as shown in FIG. 3, will automatically collapse as is conventional.

While, of course, the operation of the present invention may be manually operated, a control switch 47 may be provided in the path of travel of the return plate 32 and actuated thereby or by the stop 38, as best seen in FIG. 3. The limit switch 47 may be connected to a suitable and conventional control circuit (not shown) for deactuating the piston and cylinder assemblies 30 for retracting the nuts 20 when the thread 44 is completed and the thread means 42 is collapsed thereby allowing the springs 40 to return the lead screw 16 and thread cutting means 42 to their original position in preparation for cutting thread on a new workpiece 14.

Figure 2:
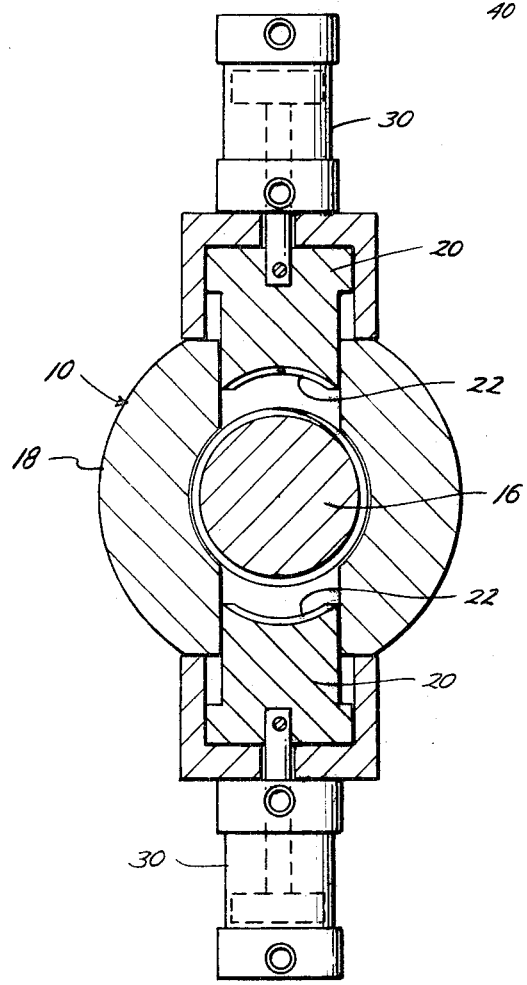
FIG. 2 is a cross-sectional view taken along the line 2—2 of FIG. 3 showing the engaging nuts in a retracted position.

In use, apparatus 10 of the present invention is shown in its normally retracted position in FIGS. 1 and 2 with the nuts 20 retracted away from the lead screw 16 and the power takeoff 12 may be stationary or continuously rotated as desired. With a new workpiece 14 placed in position and with the power takeoff 12 rotating thereby rotating the lead screw 16, the piston and cylinder assemblies 30 may be suitably actuated, either manually or automatically, to move the nuts 20 into engagement with the threads on the lead screw 16. When the nuts 20 engage the lead screw 16, the lead screw 16 will move longitudinally while rotating as there is movement between the key 22 and longitudinal keyway 24. The rotational and longitudinal movement of the lead screw 16 carries the thread cutting means 42 towards the workpiece 14 to cut the desired thread 44. When the thread 44 is completed, the thread cutting means such as the taps 46 may automatically collapse, as shown in FIG. 3, as is conventional. The control switch 47 is contacted by the stop 38 to suitably deactuate the piston and cylinder assemblies 30 to retract the nuts 20 from engagement with the lead screw 16. Upon release of the lead screw 16 from the nuts 20, the springs 20 will return the lead screw 16 and thread cutting means 42 to their original position, as best seen in FIG. 1, in preparation for the next workpiece.

The present invention, therefore, is well adapted to carry out the objects and attain the ends and advantages mentioned as well as others inherent therein.

I claim:

1. A threading attachment for connection to a continuously turning rotary power takeoff for providing a thread on a workpiece positioned axially aligned with the power takeoff comprising, a lead screw axially aligned between the rotary power takeoff and the workpiece, longitudinally slidable engaging means including a key and an elongated keyway longer than the key between the lead screw and the power takeoff whereby the screw may be moved longitudinally while being rotated, a housing fixedly secured and positioned about and supporting the lead screw, a pair of nuts each having an arcuate threaded face for engagement with the lead screw and carried by the housing on opposite sides of the screw, fluid actuated means connected to the nuts for moving the nuts into and out of engagement with the screw, a shoulder adjacent the second end of the screw, a return plate rotatably supported from the second end of the lead screw and positioned against the shoulder on the side remote from the housing, a stop member supported on said second end of the lead screw forwardly of said return plate for securing said plate longitudinally thereon, spring return means connected between the housing and the return plate acting in a direction to pull the plate against the housing thereby returning the lead screw after threading when the nuts are retracted from the screw, means between the return plate and the housing preventing rotation of the plate, means on the second end of the lead screw for supporting a collapsible thread cutting means, and switch means controlling the fluid actuating said nuts and positioned in the path of said return plate and said stop member to be actuated by said stop member after the collapse of said thread cuttings means on the completion of the thread.

* * * * *